Oct. 16, 1956     A. VON EUW     2,767,035
BEARINGS
Filed Sept. 29, 1954     3 Sheets—Sheet 1
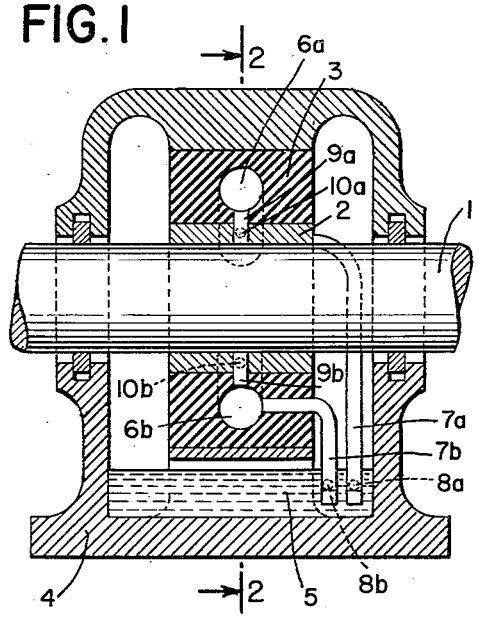
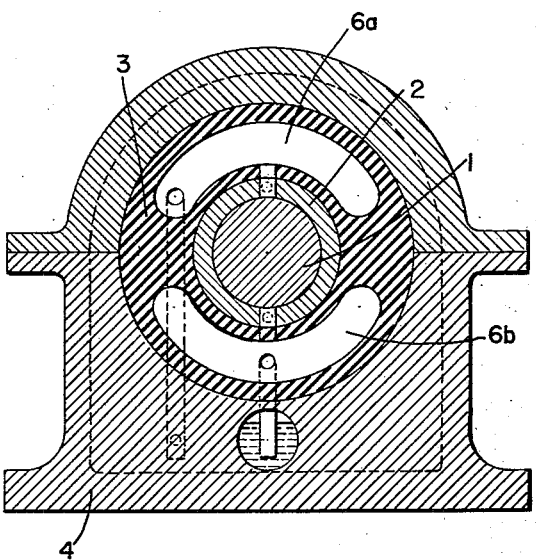
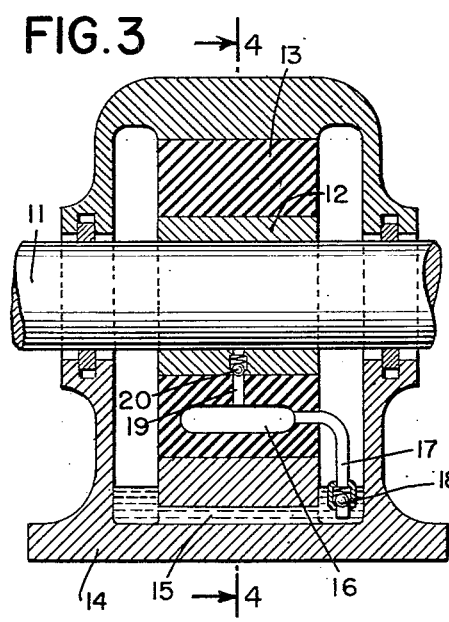
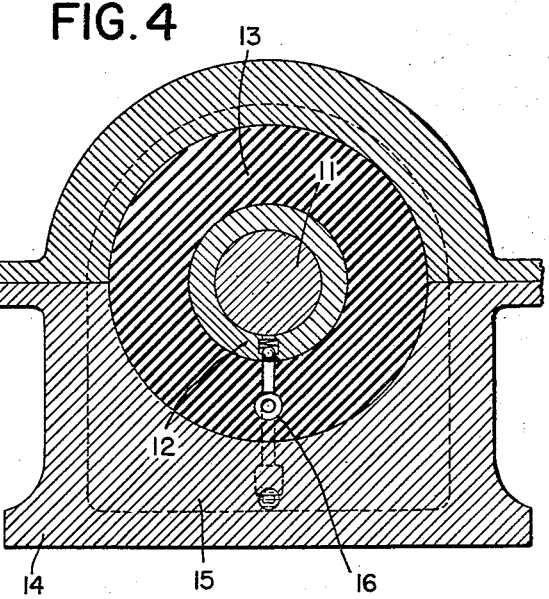
INVENTOR
ADOLFO VON EUW
*Kenyon & Kenyon*
ATTORNEYS

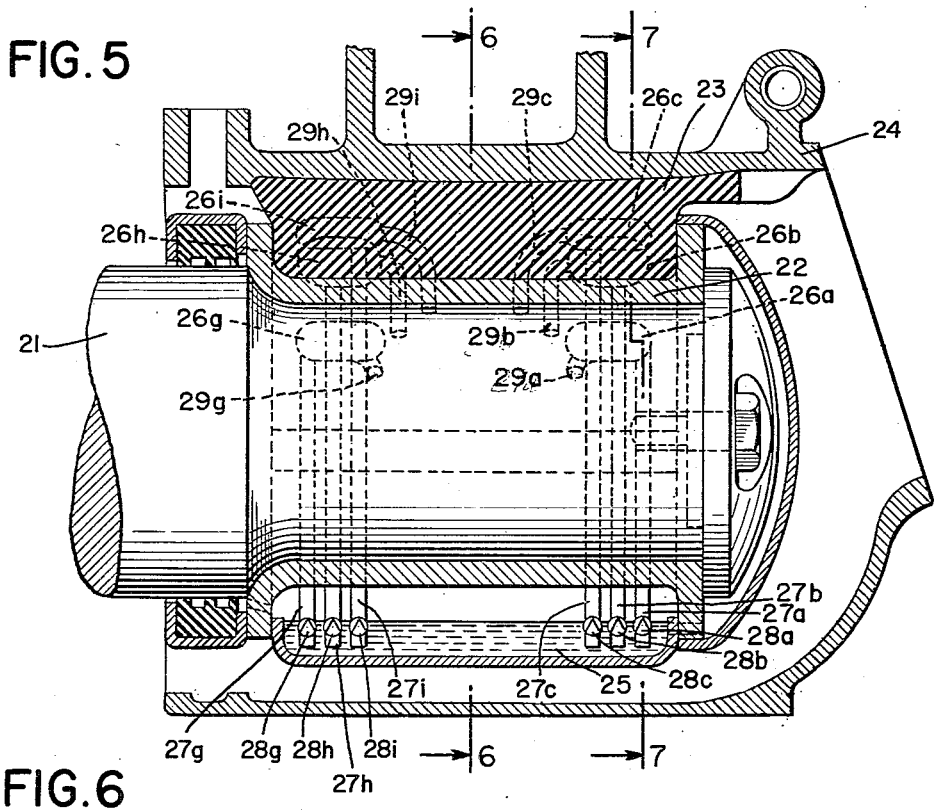
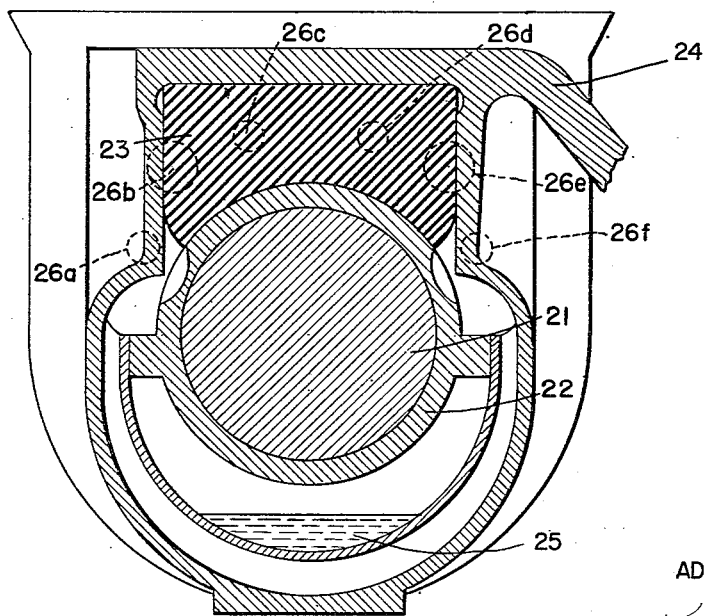
INVENTOR
ADOLFO VON EUW
ATTORNEYS

Oct. 16, 1956  A. VON EUW  2,767,035
BEARINGS
Filed Sept. 29, 1954  3 Sheets-Sheet 3

INVENTOR
ADOLFO VON EUW
Kenyon & Kenyon
ATTORNEYS

United States Patent Office 2,767,035
Patented Oct. 16, 1956

2,767,035

BEARINGS

Adolfo Von Euw, Mexico City, Mexico

Application September 29, 1954, Serial No. 459,171

12 Claims. (Cl. 308—78)

This invention relates to improvements in bearings. An object of the invention is to assure an immediate, reliable and abundant lubrication between the static and dynamic elements in bearings of railways, mills, mixers, and general machinery, and to assure a maximum degree of self-alignment and shock and vibration absorbing ability through the incorporation of elastic devices or mechanisms to the same effect.

The invention consists basically of the utilization of certain movements which are produced within elastic devices interposed between the bearing and the point of load application or support. A further object of my invention is to utilize such elastic devices, installed with the purpose of assuring self-alignment, shock absorption and vibration absorption, for the purpose of pumping lubricant to the area of contact between the rotating element and the immediately adjacent static element of the bearing.

The invention permits a great variation of designs by which the movements within the elastic element can be utilized either by using all possible directions of movement to a similar degree or by using one or another movement preferentially or by facilitating certain directions of movement or retarding movement of certain directions.

Another object of my invention is to provide a means for positively lubricating a bearing surface, the lubricant being pumped by the elastic deformation of a solid elastomer. Other advantages of the present invention will be apparent from the specification, drawings, and claims hereof.

In the drawings,

Figure 1 shows in longitudinal diagrammatic section one form of application of my invention to a bearing;

Figure 2 shows a vertical section of the same bearing on the line 2—2 in Figure 1;

Figure 3 is a diagrammatic representation in longitudinal section of another embodiment of my invention;

Figure 4 is a vertical section of the same embodiment on the line 4—4 of Figure 3;

Figure 5 is a longitudinal sectional view along the axle of an embodiment of my invention for use in railway cars and locomotives, as applied to a conventional freight car journal box;

Figure 6 is a vertical section on the line 6—6 in Figure 5; and

In Figure 6 I have not shown all of the elements in order to enable a clearer portrayal of the other elements.

Figure 8:
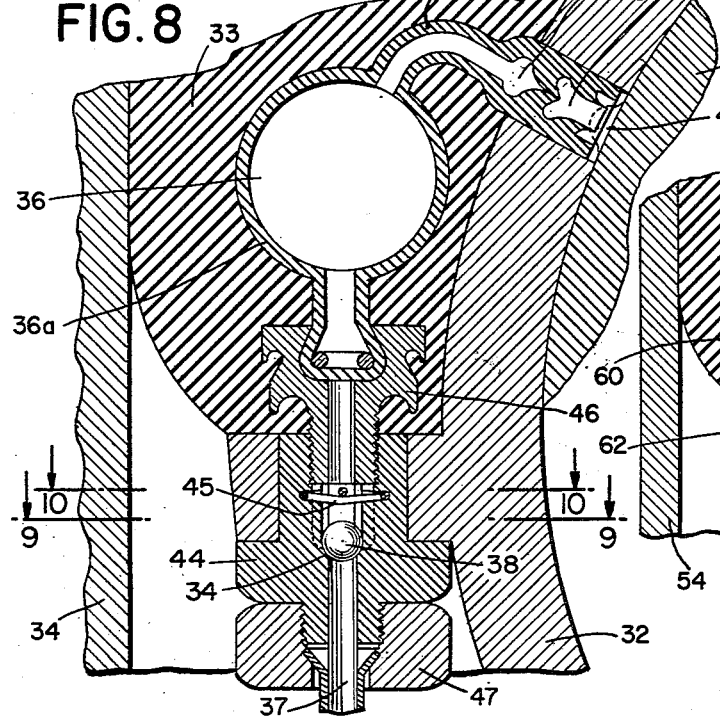

Figure 8 is a vertical sectional view of still another embodiment of my invention, including certain assembly details.

Figure 9:
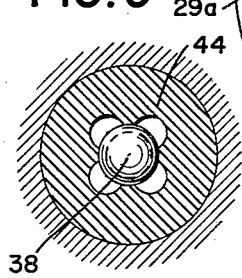
Figure 10:
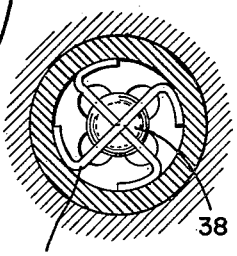

Figures 9 and 10 are horizontal sections on the lines 9—9 and 10—10 of Figure 8 respectively.

Figure 11:
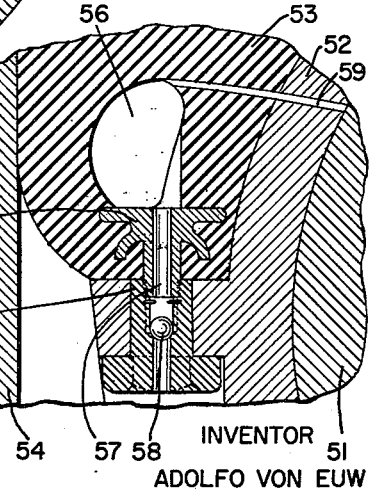

Figure 11 is a vertical sectional view of another embodiment of my invention.

Referring now to the embodiment shown in Figures 1 and 2, the load supporting axle 1 is mounted for rotation in bearing 2, which may be a simple metal bushing and can be made of any conventional bearing material. Bearing 2 is supported by a cushion of elastic material 3 which may be of rubber, synthetic rubber, or any other natural or synthetic elastomer or mixtures thereof, which in turn rests in the bearing housing 4 which serves both as a support for the assembly and as an oil well or sump 5. The elastic cushion 3 is provided with cavities 6a and 6b which are connected to the oil sump by oil suction tubes 7a and 7b, the ends of which are immersed in the lubricant.

The suction tubes are provided respectively with check valves 8a and 8b, which permit flow of oil from the sump to the cavities, but not in the reverse direction. The oil suction tubes may be flexible metal or plastic tubes extending from the oil sump to the cavities, or the metal or plastic tubes may connect with openings in the elastic cushion which serve as oil conduits. The cavities 6a and 6b are also provided with oil discharge tubes 9a and 9b which lead to the interface between axle 1 and bearing 2. These tubes may be constructed of the same material as suction tubes 7a and 7b. The discharge tubes are preferably provided with check valves 10a and 10b, which permit flow of lubricant only from the cavities to the interface.

As load is applied on axle 1 or whenever the load on the axle varies or whenever there is any change in the direction of the application of the load on the axle there is a resulting deformation of the elastic cushion or seating 3 which supports the bearing 2. The result of the deformation of the elastic cushion is that the shape and volume of cavities 6a and 6b is correspondingly changed. With deformation which increases the volume of either of the cavities oil is drawn up from the sump 5 through the corresponding oil suction tube. As the volume of a cavity is decreased, lubricant is forced from that cavity, through the discharge tube connected with that cavity, to the bearing interface.

In the embodiment shown in Figures 3 and 4, the load carrying axle is represented by the numeral 11. The axle rotates in bearing 12 which rests in a cushion of elastic material 13 and that is in turn supported by the bearing housing 14 which forms an oil well or sump 15. The elastic cushion is provided with a cavity 16, connected to the oil sump by suction tube 17, one end of which is immersed in the oil, provided with check valve 18 and to the interface between axle 11 and bearing 12 by an oil discharge tube 19 provided with check valve 20.

The embodiment of Figures 3 and 4 operates in the same manner as the embodiment of Figures 1 and 2 except that in the embodiment later discussed there is only one cavity in the elastic cushioning material.

Figure 7:
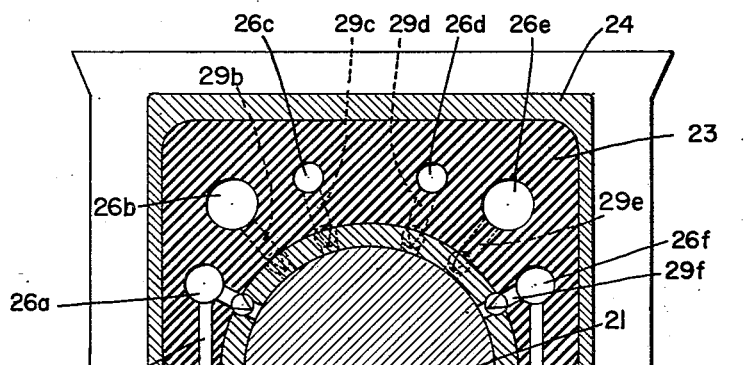
Figure 7 is a similar section on the line 7—7 of Figure 5.

Figures 5, 6, and 7 show an embodiment of the invention particularly adapted for use in railway cars and locomotives and as shown my invention is applied to a conventional freight car journal box. In this embodiment the axle 21 rotates in the bearing 22. The load transmitted from the vehicle through the top of the journal box 24 is cushioned from the bearing by an elastic element 23 which transmits the load to the bearing and thence to the wheels, which are not shown. In this embodiment I prefer that the oil sump 25 should be independent of the housing in order to maintain the sump in fixed relation to the axle 21 rather than to the housing. In order to obtain the desired pumping effect from the deformation of the elastic insert 23 caused by variations in magnitude and direction of the load the elastic insert 23 contains several cavities (26a, 26b, 26c, etc.) which are connected to the oil sump through corresponding oil suction tubes 27a, 27b, 27c, etc. provided respectively with check valves 28a, 28b, 28c, etc. The ends of the suction tubes are immersed in the lubricant in the sump. The same cavities are respectively connected to the interface between the axle and bearing through discharge tubes 29a, 29b, 29c, etc. Although check valves in the oil discharge tubes are not usually necessary in this embodiment, they may be provided if desired.

The embodiment of Figures 5, 6, and 7 functions in the same manner as the embodiments previously described. In each case the bearing and bearing housing are so constructed that an elastic material is interposed as a cushion. Motion or change of load or variation of motion of the bearing or axle causes deformation of the elastic material and resulting change in shape and volume of one or more cavities embedded therein. By means of the suction tubes submerged in the liquid lubricant, the oil discharge tubes, and the corresponding check valves, the variation of volume of the cavities produces a pumping effect which supplies lubricant to the bearing interface.

In the embodiment shown in Figures 8, 9, and 10 the journal or shaft 31 is fixed for rotation within bearing 32. Between the bearing 32 and the journal box 34 is elastic seating or cushion 33, which is a natural or synthetic elastomer to which may be added various fillers, etc. Within the elastic cushion 33 are one or more cavities 36 lined with a layer 36a of a flexible material firmly adhering to the elastic cushion 33. Liner 36a may be constructed of specially treated elastomers, such as neoprene and the like, which are highly resistant to lubricating oil. The lining may also be made of such elastomer with asbestos, cotton, nylon, or other extender or filler. The cavity is connected by flexible metal or plastic suction tube 37 to the oil sump, not shown, of the journal box. The suction tube is provided with a check ball 38.

Also communicating with the cavity 36 is a discharge tube 39 which passes through the elastic cushion and the bearing shell. This discharge tube may be constructed of the same material as the lining 36a. As shown, tube 39 has formed in it a hollowed out section 40 following which, between the hollowed out section and the end of the discharge tube farthest from the cavity 36 the tube is so shaped as normally to come together and seal the passageway. Beyond this constricted portion the tube again widens out as shown at 41. At its end, the tube communicates with an oil groove 42 in the bearing surface. It will be seen that the hollowed out portion 40 and the constriction which follows it act as a check valve in the discharge tube, since the configurations of chambers 40 and 41 are such that pressure in chamber 40 will force the walls of the tube apart and permit lubricant to pass through the space previously constricted, while suction on 40 will reseal the orifice. Check ball 38 is conventional in construction and operation. It seats on the shoulder 43 in the threaded member 44 and its vertical movement is limited by the holder 45. 46 designates a threaded metal holder for fastening the check valve assembly within 44 to the elastomer cushion 33. Suction tube 37 is secured within the threaded nut 47 which connects the suction tube to the check valve assembly. The general operating principle of this embodiment is the same as of those previously described in that variations in the magnitude or direction of application of the load on the journal cause deformation of the elastic cushion which in turn results in changes in the volume of the cavities or chambers 36 resulting in a pumping of lubricant which is taken in through tube 37 past check valve 38 as the volume of the chamber increases and is then forced through discharge tube 39 and valve 40 to the oil groove 42 as the walls of cavity 36 are compressed and its volume decreased.

In the embodiment shown in Figure 11 axle or journal 51 rotates in bearing 52. Between bearing 52 and the journal box 54 is elastic seating pad or cushion 53 containing one or more cavities 56. Oil suction tube 57 equipped with check valve 58 and a flexible oil discharge tube 59 leading from cavity 56 to the interface between the bearing and shaft are provided. The check valve assembly for the suction tube is secured by metal holder 60 which is vulcanized into the elastomer of the seating pad and the suction tube and check valve assembly are secured by nut 62 which connects with member 60 by threads. The mode of operation of this embodiment is the same as those previously described.

While my invention does not depend on the use of any particular elastomer, I may use natural rubber, built up with fillers and vulcanized, vulcanized mixtures of rubber and gutta percha, and synthetic rubbers such as butadiene-styrene copolymers, butadiene-acrylonitrile copolymers, butyl rubber, neoprene and other synthetic elastomers, such as various plastics known in the art.

By using such elastomers as a cushion between the bearing and the point of load application or support, and by providing the deformable cavities within the elastic cushion, such cavities being connected with the oil reservoir or sump and with the bearing-axle interface, I provide a positive means whereby any variation in load or direction of strain forcibly and positively injects oil at the interface where it is needed. Among the advantages of my invention are the injection of lubricant between the load surfaces of the journal and bearing even before the journal begins turning, automatic alignment between the static element and the journal, ability to absorb shocks and extremely simple automatic lubrication providing an ample flow of lubricant to the point where it is required. It will be seen that my invention permits the use of forces exerted between the static and dynamic elements of bearing assemblies for the purpose of forcing oil to the bearing friction interface obtaining at the same time a high degree of self-alignment and of shock and vibration absorption.

What is claimed is:

1. In a bearing assembly, an axle supported for rotation in a bearing, a load supported by the bearing, elastically deformable means defining an interior cavity within said means interposed between the bearing and the load permitting relative motion of the bearing and the load, a lubricant-containing reservoir associated with the bearing assembly, means for conducting lubricant from the reservoir into said cavity upon deformation-induced increase in volume of said cavity and means for conducting lubricant from said cavity to a point adjacent the interface between said bearing and said axle.

2. In a bearing assembly, an axle supported for rotation in a bearing, a load supported by the bearing, elastically deformable means defining an interior cavity within said means interposed between the bearing and the load permitting relative motion of the bearing and the load, a lubricant-containing reservoir associated with the bearing assembly, a conduit for conducting lubricant from the reservoir into said cavity upon deformation-induced increase in volume of said cavity and a conduit for conducting lubricant from said cavity to a point adjacent the interface between said bearing and said axle.

3. In a bearing assembly, an axle supported for rotation in a bearing, a load supported by the bearing, elastically deformable means defining an interior cavity within said means interposed between the bearing and the load permitting relative motion of the bearing and the load, a lubricant-containing reservoir associated with the bearing assembly, a conduit for conducting lubricant from the reservoir into said cavity upon deformation-induced increase in volume of said cavity, a conduit for conducting lubricant from said cavity to a point adjacent the interface between said bearing and said axle, and a check valve within said first-mentioned conduit blocking the flow of lubricant from said cavity to said reservoir through said conduit means.

4. In a bearing assembly, an axle supported for rotation in a bearing, a load supported by the bearing, massive elastically deformable means defining an interior cavity within said means interposed between the bearing and the load, a lubricant-containing reservoir associated with the bearing assembly, conduit means enclosed within said deformable means for conducting lubricant from the reservoir into said cavity upon deformation-induced increase in volume of said cavity and means for conducting lubricant from said cavity to a point adjacent the interface between said bearing and said axle.

5. In a bearing assembly, an axle supported for rotation in a bearing, a load supported by the bearing, massive elastically deformable means interposed between the bearing and the load to allow limited relative motion of the bearing and the load and defining an interior cavity within said means, a lubricant-containing reservoir associated with the bearing assembly, means for conducting lubricant from the reservoir into said cavity upon deformation-induced increase in volume of said cavity and means for conducting lubricant from said cavity to a point adjacent the interface between said bearing and said axle upon deformation-induced decrease in volume of said cavity.

6. In a bearing assembly, an axle supported for rotation in a bearing, a load supported by the bearing, elastically deformable means interposed between the bearing and the load and defining a plurality of interior cavities within said means, a lubricant-containing reservoir associated with the bearing assembly, a conduit for conducting lubricant from the reservoir into said cavities upon deformation-induced increase in volume of said cavity and a conduit for conducting lubricant from said cavities to a point adjacent the interface between said bearing and said axle, and means associated with said conduit means blocking flow of lubricant therein in the reverse direction.

7. In a railroad bearing assembly a journal box, an axle supported for rotation in a bearing within said box, a lubricant-containing reservoir within said box, a load supported by the bearing, elastically deformable means between the bearing and the load permitting relative motion of the bearing and the load, said elastically deformable means defining and enclosing a cavity therein deformable with changes in stress on the elastically deformable means, means for conducting lubricant from the reservoir into said cavity upon deformation-induced increase in volume of said cavity and means for conducting lubricant from said cavity to a point adjacent the interface between said bearing and said axle.

8. In a railroad bearing assembly a journal box, an axle supported for rotation in a bearing within said box, a lubricant-containing reservoir within said box, a load supported by the bearing, massive elastically deformable means between the bearing and the load permitting limited relative motion of the bearing and the load, said elastically deformable means defining and enclosing a cavity therein deformable with changes in stress on the elastically deformable means, a conduit for conducting lubricant from the reservoir into said cavity upon deformation-induced increase in volume of said cavity and a conduit for conducting lubricant from said cavity to a point adjacent the interface between said bearing and said axle upon deformation-induced decrease in volume of said cavity.

9. In a railroad bearing assembly a journal box, an axle supported for rotation in a bearing within said box, a lubricant-containing reservoir within said box, a load supported by the bearing, massive elastically deformable means between the bearing and the load permitting limited relative motion of the bearing and the load, said elastically deformable means defining and enclosing therein a plurality of cavities deformable with changes in stress on the elastically deformable means, a conduit for conducting lubricant from the reservoir into said cavities upon deformation-induced increase in volume of said cavities, and means for conducting lubricant from said cavities to the interface between said bearing and said axle.

10. In a railroad bearing assembly a journal box, an axle supported for rotation in a bearing within said box, a lubricant-containing reservoir within said box, a load supported by the bearing, elastically deformable means between the bearing and the load permitting relative motion of the bearing and the load, said elastically deformable means defining and enclosing a cavity therein deformable with changes in stress on the elastically deformable means, a conduit for conducting lubricant from the reservoir into said cavity upon deformation-induced increase in volume of said cavity, means for conducting lubricant from said cavity to a point adjacent the interface between said bearing and said axle, and a check valve associated with said conduit blocking return flow of lubricant in said conduit means.

11. In a railroad bearing assembly a journal box, an axle supported for rotation in a bearing within said box, a lubricant-containing reservoir within said box, a load supported by the bearing, elastically deformable means between the bearing and the load permitting relative motion of the bearing and the load, said elastically deformable means defining and enclosing a cavity therein deformable with changes in stress on the elastically deformable means, a conduit enclosed within said elastically deformable means for conducting lubricant from the reservoir into said cavity upon deformation-induced increase in volume of said cavity, a conduit for conducting lubricant from said cavity to a point adjacent the interface between said bearing and said axle, and means preventing return flow of lubricant within said conduits.

12. In a railroad bearing assembly a journal box, an axle supported for rotation in a bearing within said box, a lubricant-containing reservoir within said box, a load supported by the bearing, elastically deformable means between the bearing and the load permitting relative motion of the bearing and the load, said elastically deformable means defining and enclosing a plurality of cavities therein deformable with changes in stress on the elastically deformable means, conduit means for conducting lubricant from the reservoir into said cavities upon deformation-induced increase in volume of said cavities and means for conducting lubricant from said cavities to a point adjacent the interface between said bearing and said axle, upon deformation-induced increase in volume of said cavity.

References Cited in the file of this patent

UNITED STATES PATENTS 563,270    Godley  _____ July 7, 1896